(12) United States Patent
Misner

(10) Patent No.: US 12,330,593 B2
(45) Date of Patent: Jun. 17, 2025

(54) ROOFTOP ACCESSORY LOCKING CLAMP

(71) Applicant: The Eastern Company, Naugatuck, CT (US)

(72) Inventor: Michael O. Misner, Lake Villa, IL (US)

(73) Assignee: The Eastern Company, Naugatuck, CT (US)

( * ) Notice: Subject to any disclaimer, the term of this patent is extended or adjusted under 35 U.S.C. 154(b) by 252 days.

(21) Appl. No.: 18/085,186

(22) Filed: Dec. 20, 2022

(65) Prior Publication Data

US 2023/0192004 A1 Jun. 22, 2023

Related U.S. Application Data

(60) Provisional application No. 63/292,808, filed on Dec. 22, 2021.

(51) Int. Cl.
*B60R 9/048* (2006.01)
*B60R 9/058* (2006.01)

(52) U.S. Cl.
CPC .............. *B60R 9/048* (2013.01); *B60R 9/058* (2013.01)

(58) Field of Classification Search
CPC .......... B60R 9/058; F16B 21/02; F16B 21/16; Y10T 403/327–328; Y10T 403/591; Y10T 403/595; Y10T 403/599; Y10T 403/60; Y10T 403/602; Y10T 403/604; Y10T 403/608; E05B 17/2034; E05B 17/2073; E05B 15/022; E05B 15/025; E05B 2015/0235; Y10S 292/05; E05C 19/02; E05C 19/028; E05C 17/52

USPC .................. 403/381, 350; 24/453, 634–635, 24/636–638, 641, 656–657, 662–664
See application file for complete search history.

(56) References Cited

U.S. PATENT DOCUMENTS

| 1,265,869 | A | * | 5/1918 | Arkin | A44B 11/266 |
| | | | | | 24/657 |
| 1,440,927 | A | * | 1/1923 | Mihalicz | A44B 17/0011 |
| | | | | | 24/657 |
| 2,455,141 | A | | 11/1948 | Runge | |
| 2,672,924 | A | * | 3/1954 | Anthes | F23D 14/465 |
| | | | | | 285/305 |
| 3,194,593 | A | * | 7/1965 | Hendry | A47B 91/02 |
| | | | | | 248/188.8 |
| 3,469,810 | A | | 9/1969 | Dorris | |
| 3,601,295 | A | | 8/1971 | Lowe | |
| 3,679,244 | A | * | 7/1972 | Reddy | F16B 21/16 |
| | | | | | 403/321 |
| 3,926,532 | A | * | 12/1975 | Schlenker | F16D 1/116 |
| | | | | | 403/322.2 |

(Continued)

*Primary Examiner* — Scott T McNurlen
(74) *Attorney, Agent, or Firm* — Leydig, Voit & Mayer, Ltd.

(57) ABSTRACT

The disclosure provides a lockable rooftop carrier clamp having a housing with a bore for accepting a frusto-conically shaped locking post. At least one, and preferably a pair of bolts are biased inwardly into the bore to capture the locking post. The bolts can be moved transversely outwardly by a cam on the outside wall of a hollow rotor located in the bore for pivotal rotation about an axis defined by the bore. The pivoting of the rotor is only allowed by the proper orientation of a tumbler core in a tumbler lock, which then allows either rotation of a release lever or retraction of a locking pin.

4 Claims, 26 Drawing Sheets

(56) References Cited

U.S. PATENT DOCUMENTS

| | | | |
|---|---|---|---|
| 4,487,349 A * | 12/1984 | Kudo | B60R 9/12 |
| | | | 224/322 |
| 5,181,639 A | 1/1993 | Kvänna | |
| 5,275,320 A | 1/1994 | Duemmler | |
| 5,657,913 A | 8/1997 | Cucheran et al. | |
| 5,769,292 A | 6/1998 | Cucheran et al. | |
| 5,806,735 A | 9/1998 | Christiansson et al. | |
| 5,845,828 A | 12/1998 | Settelmayer | |
| 6,112,965 A | 9/2000 | Lundgren | |
| 6,273,311 B1 | 8/2001 | Pedrini | |
| 6,422,441 B1 | 7/2002 | Settelmayer et al. | |
| 6,510,718 B1 | 1/2003 | Chang | |
| 6,557,220 B1 * | 5/2003 | Hamm, Jr. | A44C 7/003 |
| | | | 24/658 |
| 6,622,898 B1 | 9/2003 | Wang | |
| 6,896,232 B2 | 5/2005 | Crowell et al. | |
| 7,367,481 B2 | 5/2008 | Barbara | |
| 8,381,866 B2 | 2/2013 | Höbel et al. | |
| 8,393,508 B2 | 3/2013 | Sautter et al. | |
| 8,444,033 B2 | 5/2013 | Brochier et al. | |
| 8,496,145 B2 | 7/2013 | Sautter et al. | |
| 8,556,146 B2 | 10/2013 | Sautter et al. | |
| 8,656,561 B2 * | 2/2014 | Ingels | A44B 1/18 |
| | | | 24/103 |
| 9,381,866 B2 | 7/2016 | Sautter et al. | |
| 10,150,423 B2 | 12/2018 | Sautter et al. | |
| 10,543,771 B2 | 1/2020 | Sautter et al. | |
| 10,583,784 B2 | 3/2020 | Sautter et al. | |
| 11,097,664 B2 | 8/2021 | Vidar | |
| 11,359,405 B2 * | 6/2022 | Misner | E05B 29/0053 |
| 2003/0028983 A1 * | 2/2003 | Schmitt | B08B 9/045 |
| | | | 15/104.33 |

* cited by examiner

ROOFTOP ACCESSORY LOCKING CLAMP

CROSS-REFERENCE TO RELATED APPLICATIONS

This application claims the benefit of and priority to U.S. Provisional Patent Application No. 63/292,808, filed Dec. 22, 2021, which is incorporated by reference herein in its entirety.

BACKGROUND

Vehicle accessories of various types provide vehicle users convenient ways to extend the usefulness of their vehicles. One example is a car top carrier that provides for storage of items outside the vehicle. There is a need for a locking mechanism to easily and securely attach and detach a car top carrier to the roof of an automobile or similar vehicle. Many vehicles, especially SUV's, have a pair of rails that are either parallel to the direction of travel of the vehicle or transverse to the direction of travel. Vehicle accessories, such as carriers for sporting equipment or camping equipment can be attached to the rails. Currently, many carriers require tools to manipulate threaded fasteners or the like to attach and detach the carrier to the rails of the vehicle. It is desirable to have a locking mechanism to allow the owner of the vehicle to securely and easily attach and detach the carrier from the rails of the vehicle, preferably without the need for tools. The mechanism should provide for a low profile, aerodynamic connection between the vehicle and the accessory.

Needs exist in many other fields for a lockable connection where a chevron or Christmas tree type locking post or catch can be inserted and captured into a bore with a resilient moveable bolt or latch without the need of tools, especially one that can be retrofitted in the current space occupied by more traditional mechanical retention means that require tools for manipulation, or simply threaded fasteners.

SUMMARY

The devices, systems, and methods for lockingly clamping vehicle accessories to vehicles disclosed herein provide users a number of beneficial technical effects and a more desirable user experience as compared to known vehicle accessory clamps. Such benefits include, without limitation, greater convenience, being less expensive and less time-consuming, being easier to operate and maintain, more secure, more aerodynamic, requiring fewer modifications to vehicles to which they are attached and/or to the vehicle accessories themselves, as well as making attaching the vehicle accessories to vehicles less likely to violate vehicle warranty conditions.

A lockable rooftop carrier clamp comprises, a locking post fixed to a first substrate, the locking post having a frusto-conical plunger tapering at its first end and connected to a cylindrical stem at its base or second end, with the diameter of the cylindrical stem being smaller than the diameter of the base of the cone, with the first end of the stem attached to the base of the cone and the second end of the stem connected to the substrate, and a clamp housing fixed to a second substrate having a first bore defining a first axis with a first end adapted to accept the locking post in a captured or uncaptured condition, the clamp housing also having a second blind bore defining a second axis orthogonal to the first axis, the second bore extending through a side wall of the clamp housing. The clamp also has a bolt positioned in the first bore to slide transversely to the first axis therein, the bolt being biased inwardly and adapted to capture the locking post in a captured condition as the locking post moves past the bolt from its first end to its second end, the bolt also having an arm. A rotor is also located in the first bore, the rotor also having a bore along the first axis adapted to accept the conical portion of the locking post when it is inserted into the clamp housing first bore, the rotor also having a cam shaped exterior wall adapted to contact the arm of the bolt so that when the rotor is pivoted from a captured condition to an uncaptured condition about the first axis, the cam on the exterior wall moves the bolt transversely outwardly against the bias and away from the locking post, the rotor also having a locking pin extending outwardly from the rotor exterior. The clamp also has a release lever operatively connected to the rotor and extending from the rotor transverse to the first axis to a location outside the clamp housing for pivoting the rotor about the first axis from an uncaptured to a captured condition and from a captured condition to an uncaptured condition, and a hollow generally cylindrical lock housing located in the second blind bore having lock housing bore and a longitudinal spline and adapted to receive a core having a plurality of tumblers variously biased into the spline and retracted from the spline in the presence of an appropriate key to allow the core to rotate in the bore from a locked to an unlocked condition along the second axis, the core having a keyway at a first end for accepting a key and an adapter at the opposite second end, with the adapter interfering with the locking pin when the core is in the locked condition so that the rotor cannot pivot, and allowing pivoting of the rotor about the first axis by the release lever while the core is in the unlocked condition.

A lockable rooftop carrier clamp comprises a locking post fixed to a first substrate, the locking post having a frusto-conical plunger tapering at its first end and connected to a cylindrical stem at its base or second end, with the diameter of the cylindrical stem being smaller than the diameter of the base of the cone, with a first end of the stem attached to the base of the cone and a second end of the stem connected to the first substrate, and a hollow generally cylindrical clamp housing fixed to a second substrate having a bore along the axis of the cylinder with a first end adapted to accept the locking post in a captured or uncaptured condition, and a pair of bolts positioned opposite each other in the clamp housing bore adjacent its first end and adapted to slide transversely therein, the bolts being biased inwardly to capture the locking post in a locked condition, the bolts also having arms. A hollow generally cylindrical rotor is also located in the clamp housing bore, the rotor having a bore and a cam shaped exterior wall adapted to contact the arms of the bolts so that when the rotor is pivoted from a locked condition to an unlocked condition, the exterior wall moves the bolts transversely outwardly against the bias and away from the locking post. A hollow generally cylindrical lock housing has a bore adapted to receive a core, the lock housing bore also having a longitudinal spline adapted to receive a plurality of tumblers extending transversely from the core and variously biased into the spline and retracted from the spline in the presence of an appropriate key to allow the core to rotate from a locked to an unlocked condition along the axis of the bore, the lock housing also having a transverse aperture adapted to accept a lock bolt therein, the core having a keyway at a first end for accepting a key and a nub at the opposite second end, with the nub aligned with the lock housing aperture to move the lock bolt into and out of the aperture in response to rotation of the core, with the lock bolt extending out of the aperture in the locked condition and into the aperture in the unlocked condition, the lock housing having a first end with wings extending radially from the first end and a second end having an adapter, with the adapter fixed to the rotor. A hollow generally cylindrical spacer has a bore adapted to accept the second end of the lock housing, the spacer also having a transverse aperture, the spacer aperture adapted to accept the lock bolt when it extends out of the lock housing aperture in the locked condition, the spacer having a first end and a second end affixed to the clamp housing. When the core is in the locked condition, the nub extends the lock bolt through the lock housing aperture and into the spacer aperture so the rotor cannot rotate in the clamp housing, and when the core is in the unlocked condition, the nub retracts the lock bolt from the spacer aperture and the rotation of the lock housing will rotate the rotor, and the cam on the outside of the rotor will move the bolts radially outwardly against the bias to allow the locking post to be retracted.

Further and alternative aspects and features of the disclosed principles will be appreciated from the following detailed description and the accompanying drawings. As will be appreciated, the principles related to devices, systems, and methods for securing accessories, especially car top or roof top carriers to vehicles are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Figure 1:
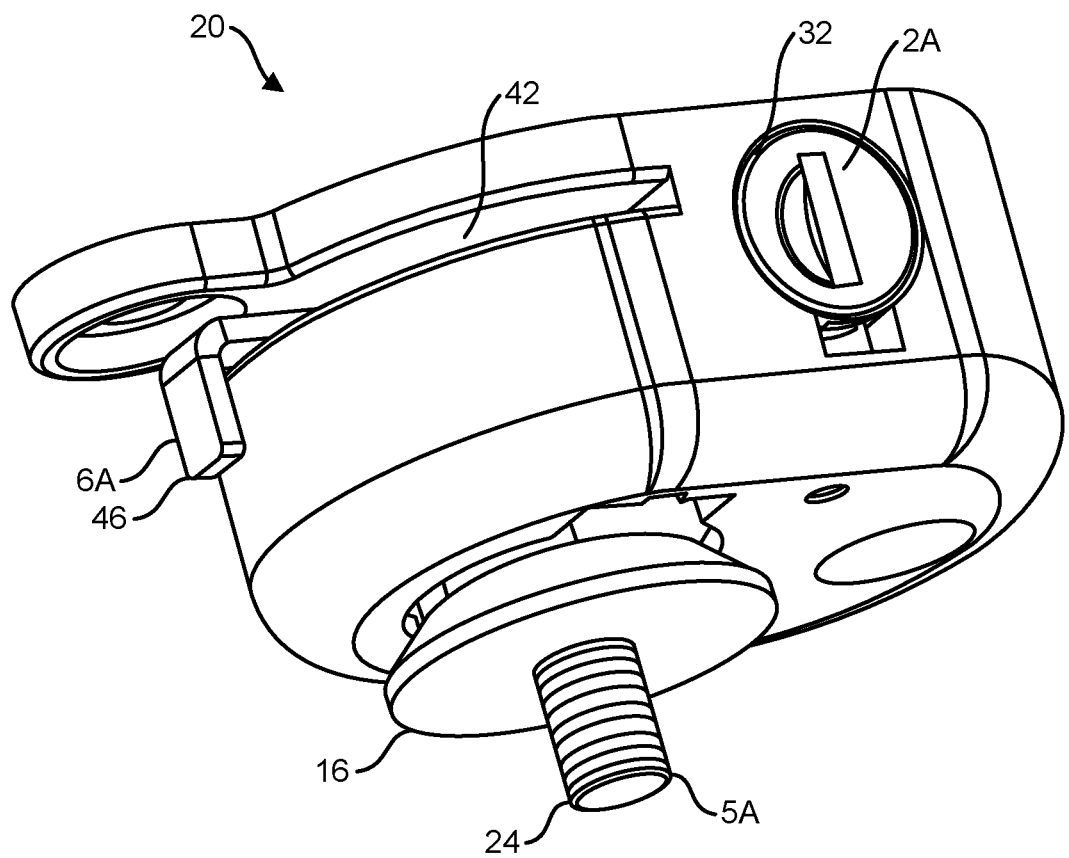
FIG. 1 is a perspective view of one embodiment of the inventive rooftop carrier clamp.

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

FIGS. 1-12 generally depict a first embodiment of the inventive rooftop carrier clamp 20. A locking post 5A is releasably captured in a roof clamp housing 8A. The locking post 5A has a frusto-conical portion 22 with a base and a threaded cylindrical stem portion 24 attached to the base of the conical portion 22. The stem portion 24 may also include a skirt 16. The stem portion 24 can be threaded into a complementary threaded female bore in a first substrate. In one embodiment, the locking post is affixed to a rail of a car. As noted above, the rail may be transverse to the direction of travel of the automobile, including an SUV or truck, or it may be parallel to the direction of travel. Alternatively, the locking post 5A may be directly affixed to the automobile. In these embodiments, the housing 8A is affixed to the carrier. In further alternative embodiments, the locking post 5A may be attached to the carrier and the housing attached to the rail of the car, or directly to the car.

The clamp housing 8A has a stepped bore 18 extending there through and defining a first axis 26. In a preferred manner of use, the axis 26 is vertical. The first substrate, or carrier with a depending locking post 5A can be lowered onto the housing 8A that is attached to the vehicle. The locking post extends into the bore 18 and is securely snapped into place as will be described later. Alternatively, the carrier may be the second substrate attached to the housing 8A and lowered onto a vertical upstanding locking post 5A attached to the vehicle, preferable a rail on the roof of a vehicle.

In a preferred embodiment, residing in or around the bore 18 is a rotor 3A, a pair of bolts 7A, a rear cover 4A, a pair of springs 11A, a locking pin 10A, and an internal retaining ring 9A. One embodiment utilizes a single bolt 7A and spring 11A. The rotor 3A is generally cylindrical with a stepped outer wall. One of the steps in the outer wall cooperates with a step in the bore 18 to locate the rotor 3A in the bore 18 so the rotor can pivot or rotate in the bore 18 about the first axis 26. The bolts 7A move in a plane transverse to the first axis 26 and are urged into the bore 18 by a pair of springs 11A. In one embodiment, each bolt has a pair of springs biasing the bolt inwardly in the bore 18 to provide additional inward bias. The springs contact one side of the bolt arms 28 to bias the bolts inwardly into the space around the stem 24 beneath the base of the cone 22 to capture the locking post 5A. The rotor 3A also has a cam shaped outer surface 48 proximate one end in contact with the arms 28 of the bolts 7A. In an uncaptured condition, the outer walls of the 48 cam push against the arms 28 on the opposite side from the springs 11A to retract the bolts 7A, so the locking post 5A can be removed from the bore 18.

A locking pin 10A extends radially outwardly from a bore in the rotor. The locking pin 10A works in conjunction with an adapter 30 associated with a core 2A of an associated lock 32, as will be described later, to allow or block the pivoting of the rotor 3A about the first axis 26 in the bore 18.

The lock 32 has a hollow generally cylindrical lock housing 1A fixedly located in a second bore 34 having an axis 36 that is orthogonal to the first axis 26. In one embodiment, the walls of the second bore 34 in the clamp housing 8A may act as the lock housing 1A. In a preferred embodiment, the lock housing 1A is pinned in place in the clamp housing 8A by a lock housing retaining pin 12A located in a bore 38 parallel to the housing bore 18. The lock housing 1A has a bore in which the tumbler core 2A can pivot and a pair of longitudinal splines parallel to the bore. The core 2A has a plurality of tumblers biased outwardly and into the splines in the absence of a key in a locked or unlocked condition. Examples of tumbler locks that can be used in this application include those found in commonly assigned U.S. Pat. Nos. 5,964,110 and 11,359,405, the disclosures of which are fully incorporated herein, as well as other serrated key and blade key tumbler style locks in which a core or plug with a plurality of tumblers is able to rotate about an axis, such as the second axis 36 here, from a locked or unlocked condition in a barrel or lock housing by using an appropriate key.

Figure 4:
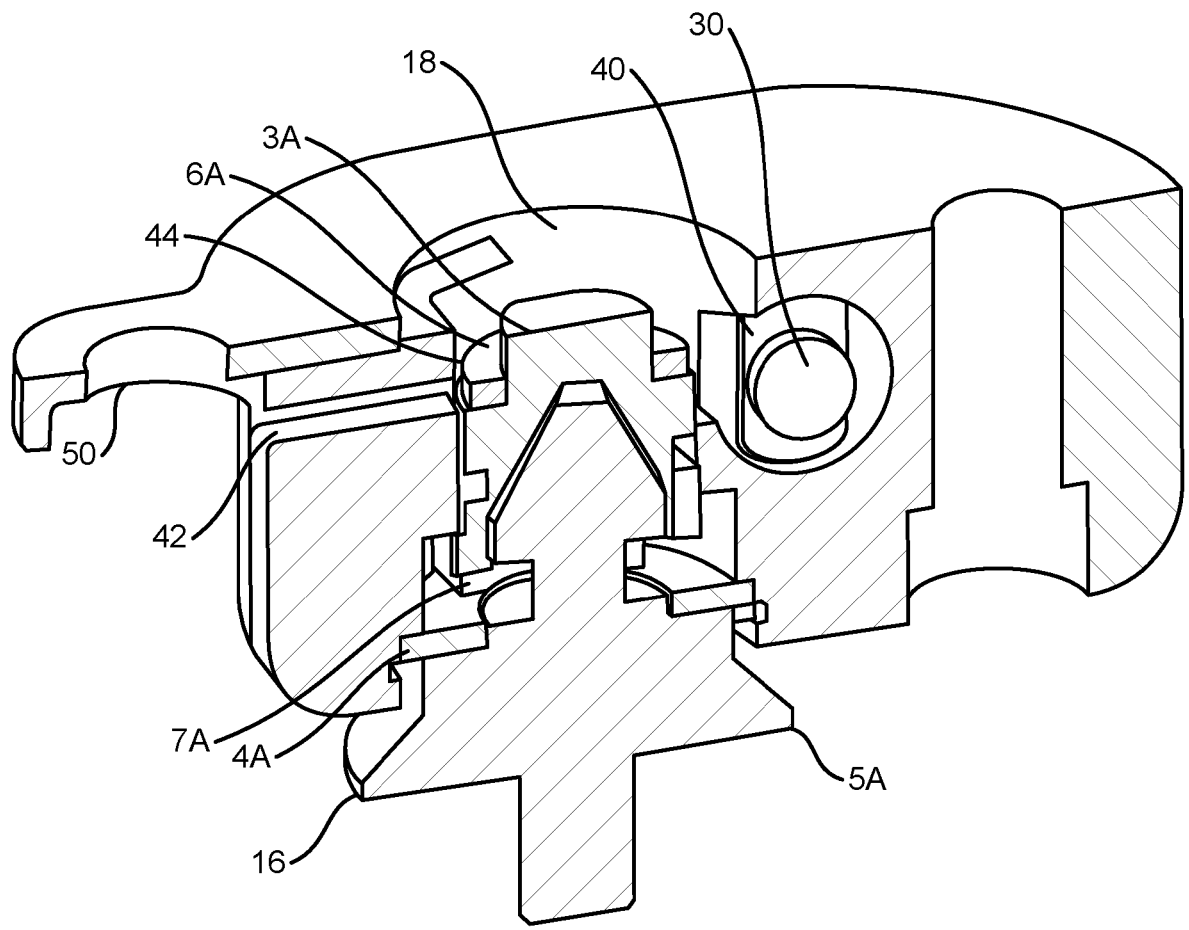
FIG. 4 is a cut away perspective view of one embodiment of the inventive rooftop carrier clamp in the unlocked condition.
Figure 5:
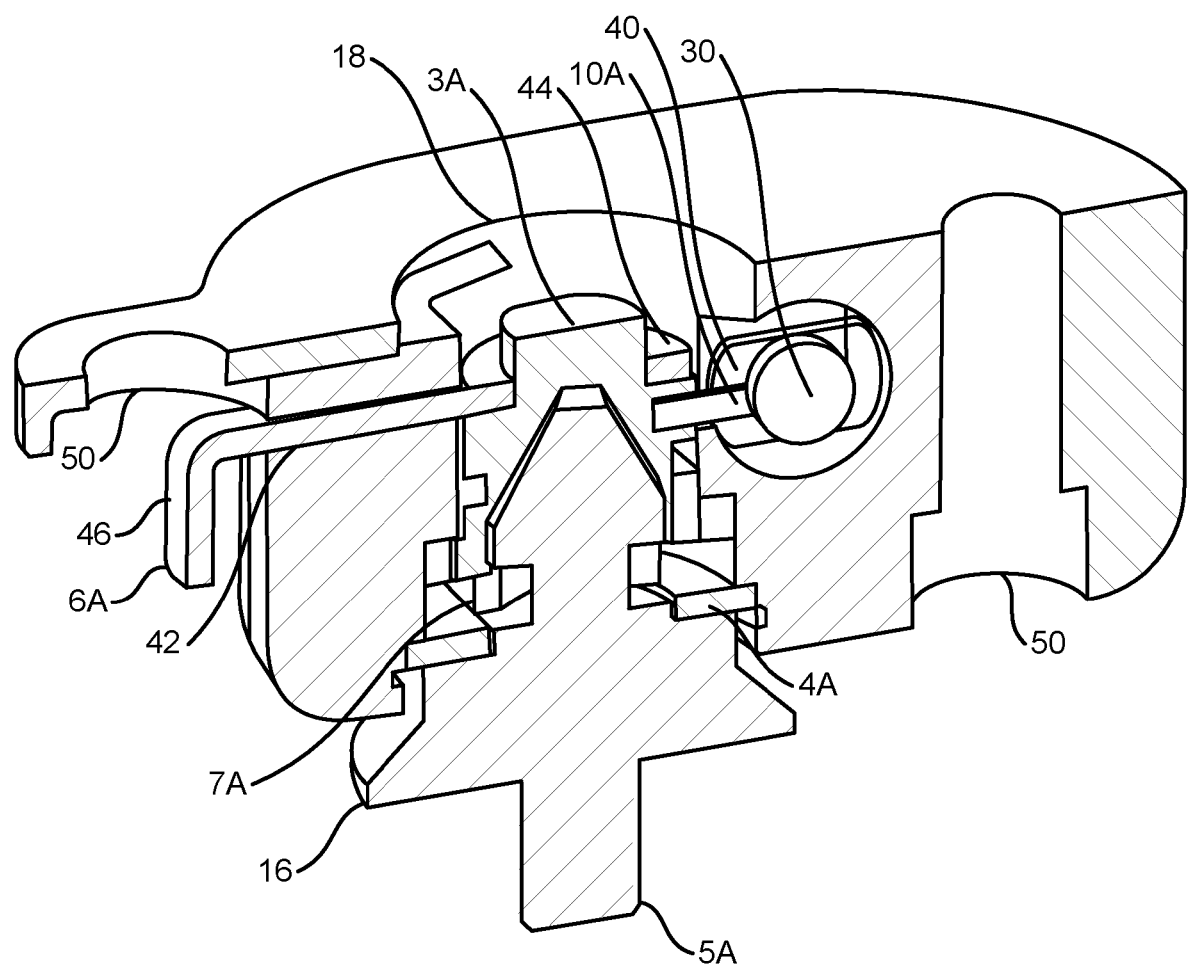
FIG. 5 is a perspective view of one embodiment of the inventive rooftop carrier clamp in the locked condition.
Figure 6:
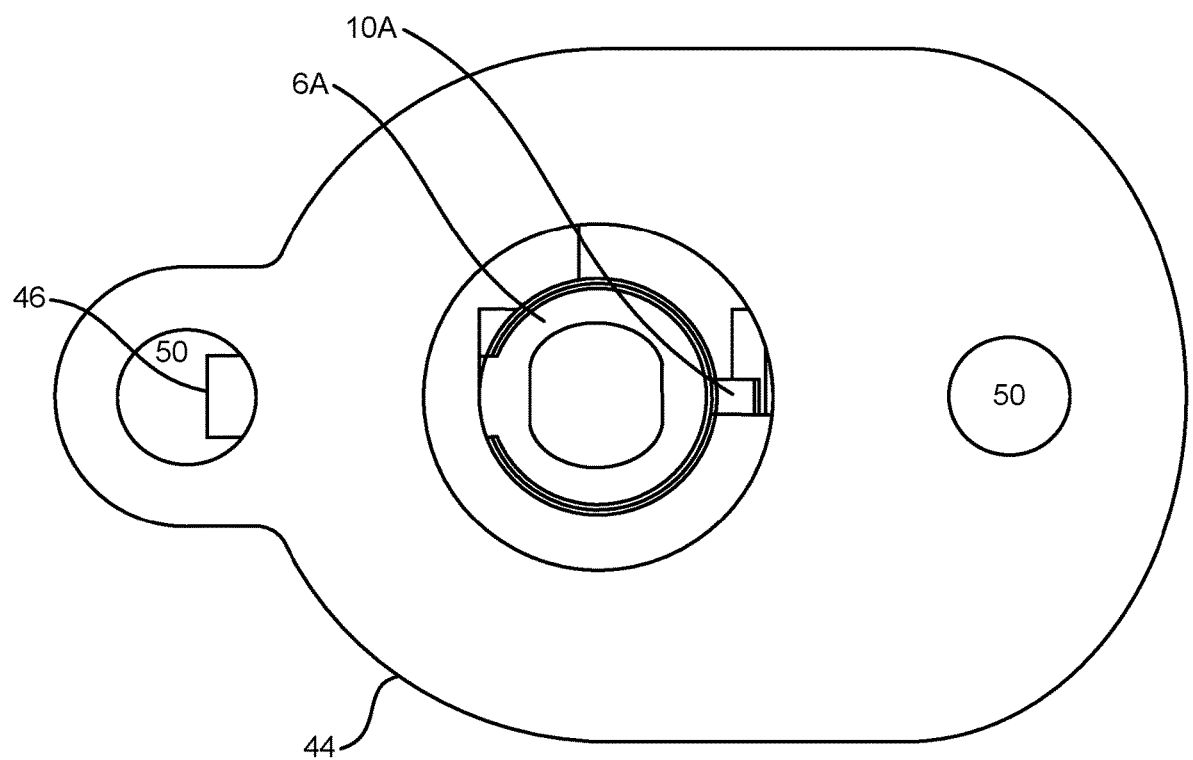
FIG. 6 is a top view of one embodiment of the inventive rooftop carrier clamp in the unlocked condition.
Figure 7:
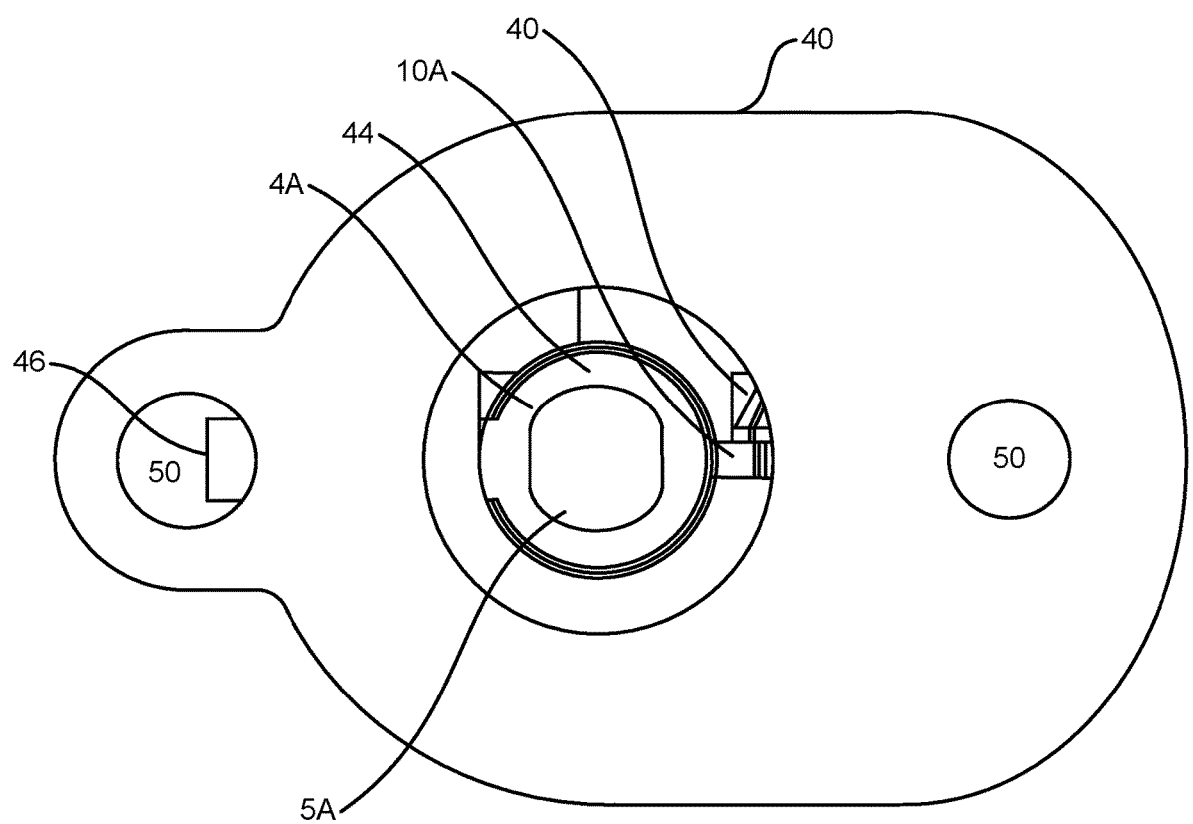
FIG. 7 is a top view of one embodiment of the inventive rooftop carrier clamp in the locked condition.
Figure 8:
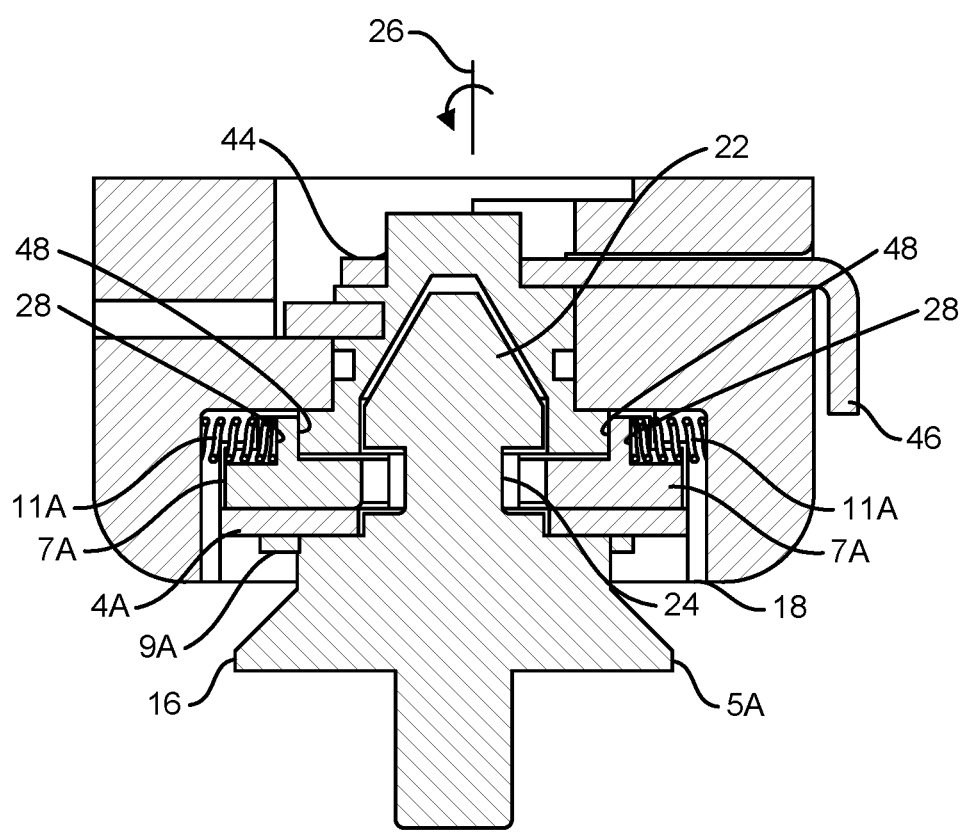
FIG. 8 is a cross section of one embodiment of the inventive rooftop carrier clamp in the unlocked condition.
Figure 9:
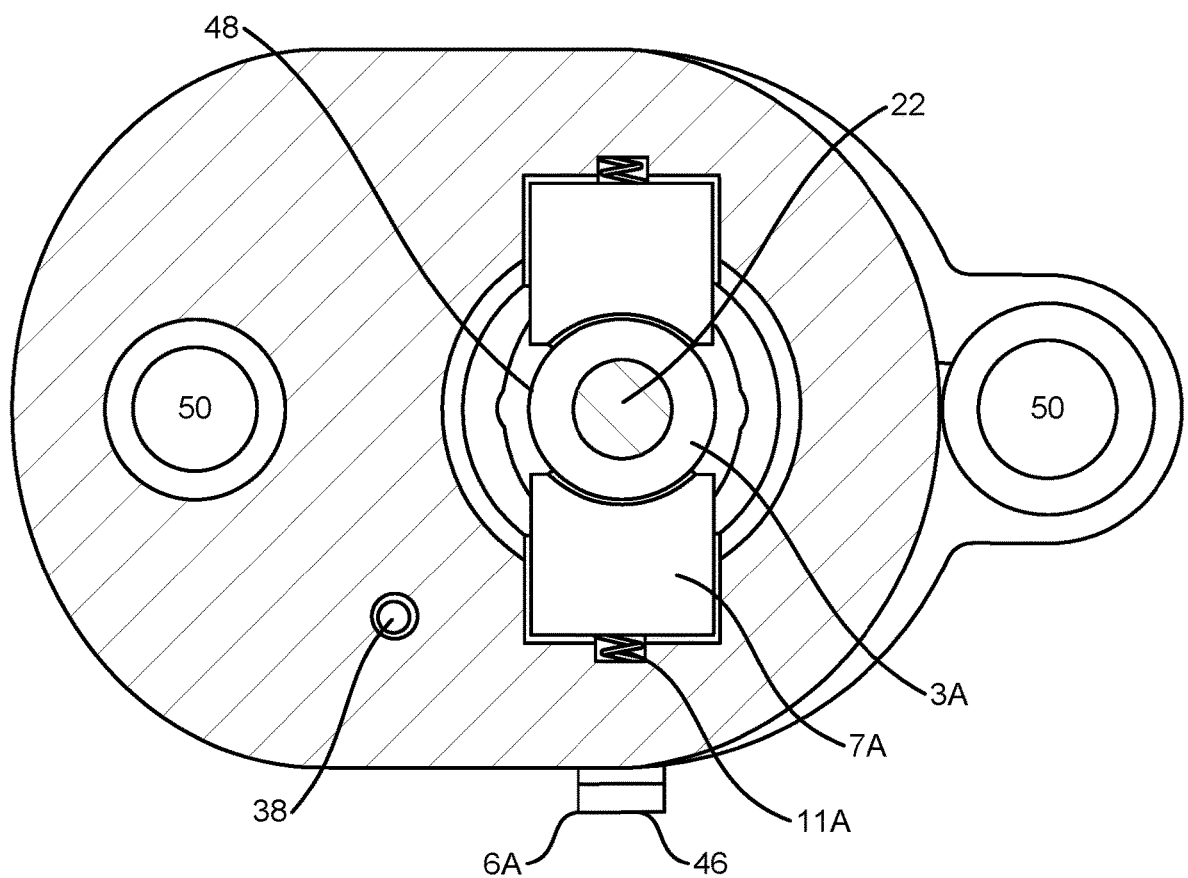
FIG. 9 is a bottom view of the inventive rooftop carrier clamp in the unlocked condition.
Figure 12:
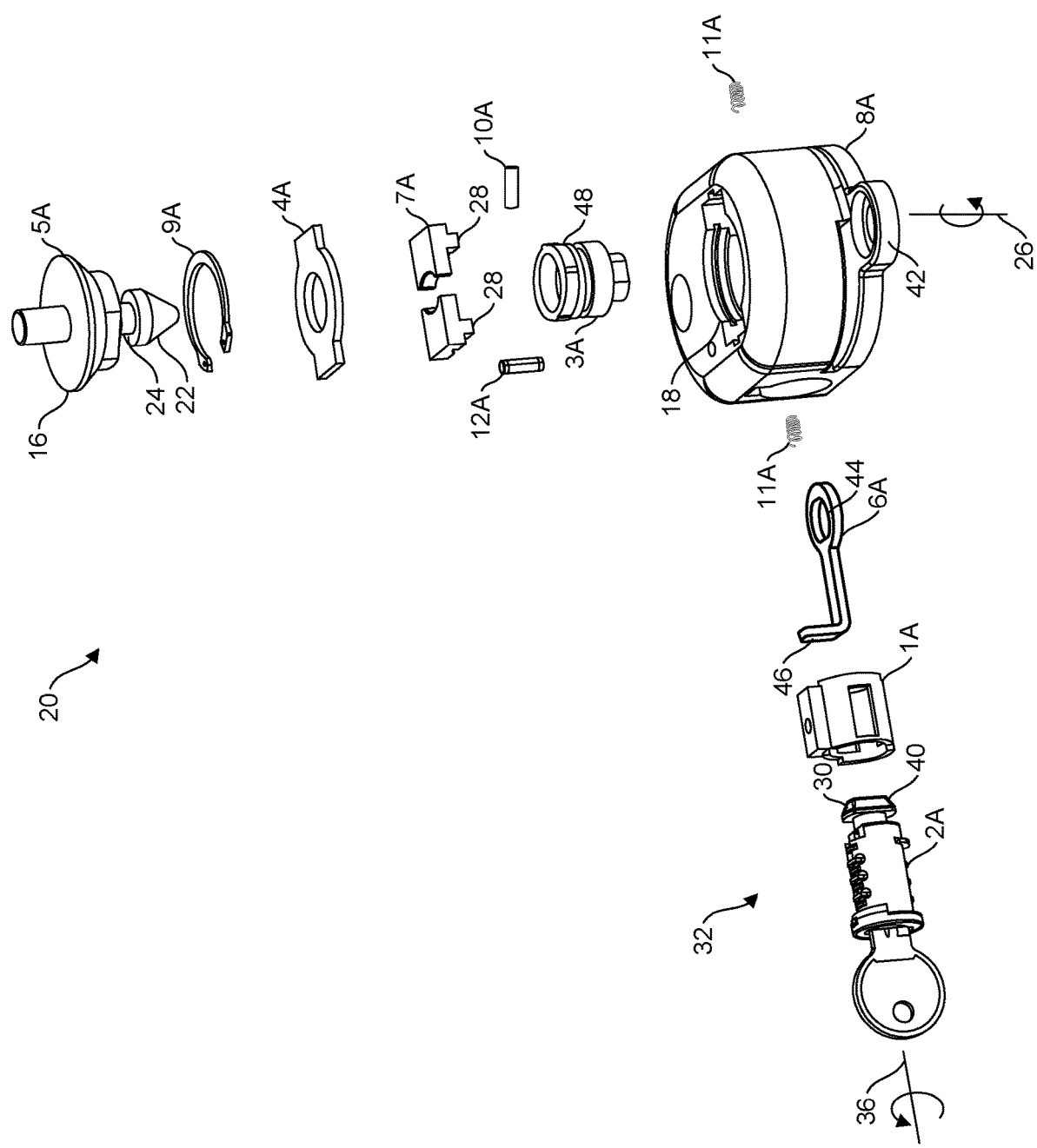
FIG. 12 is an exploded view of the inventive rooftop carrier clamp.
Figure 13A:
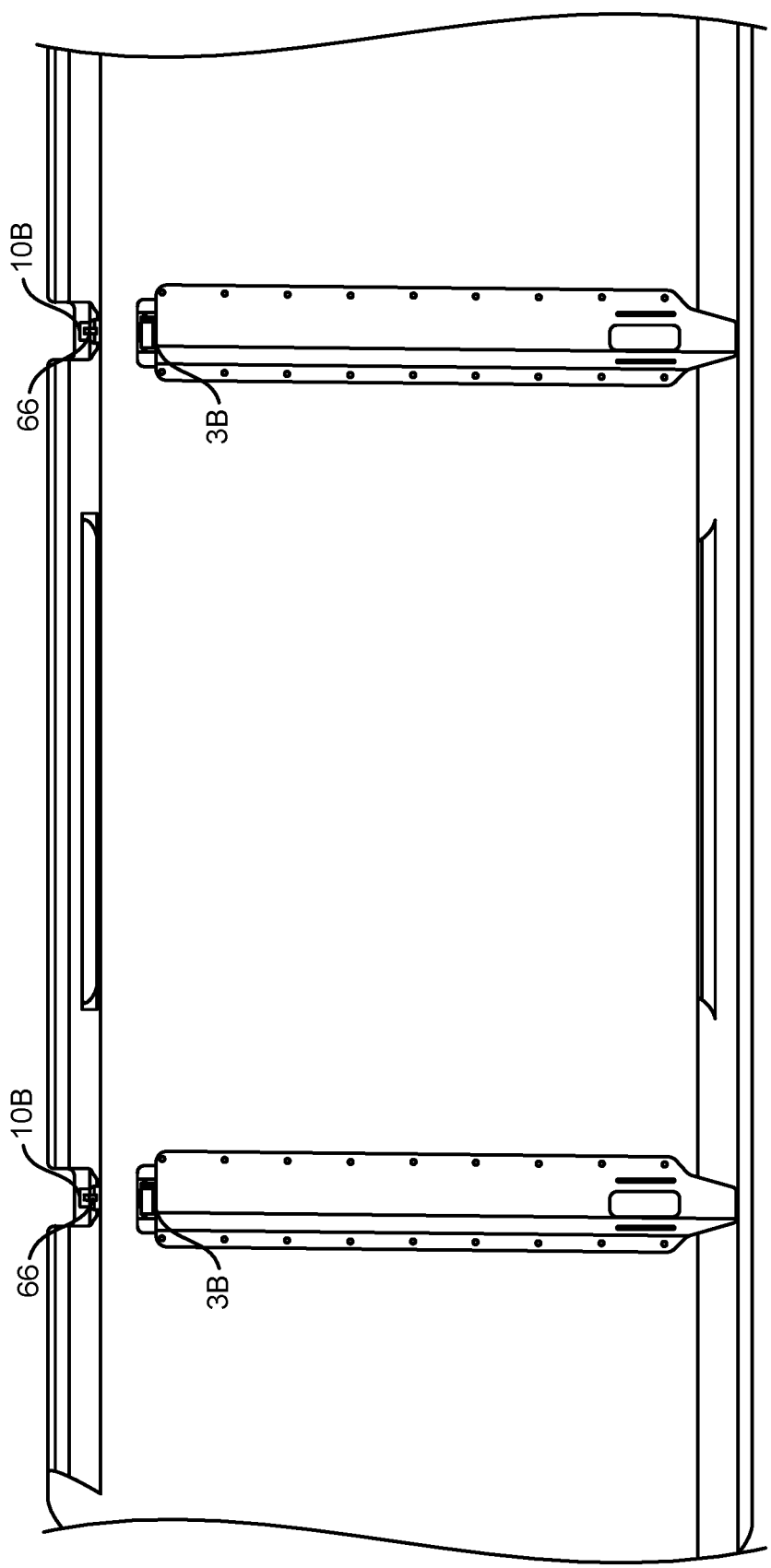
FIG. 13A is a bottom view of a second embodiment of the rooftop carrier clamp in use with a plate carrier.
Figure 13B:
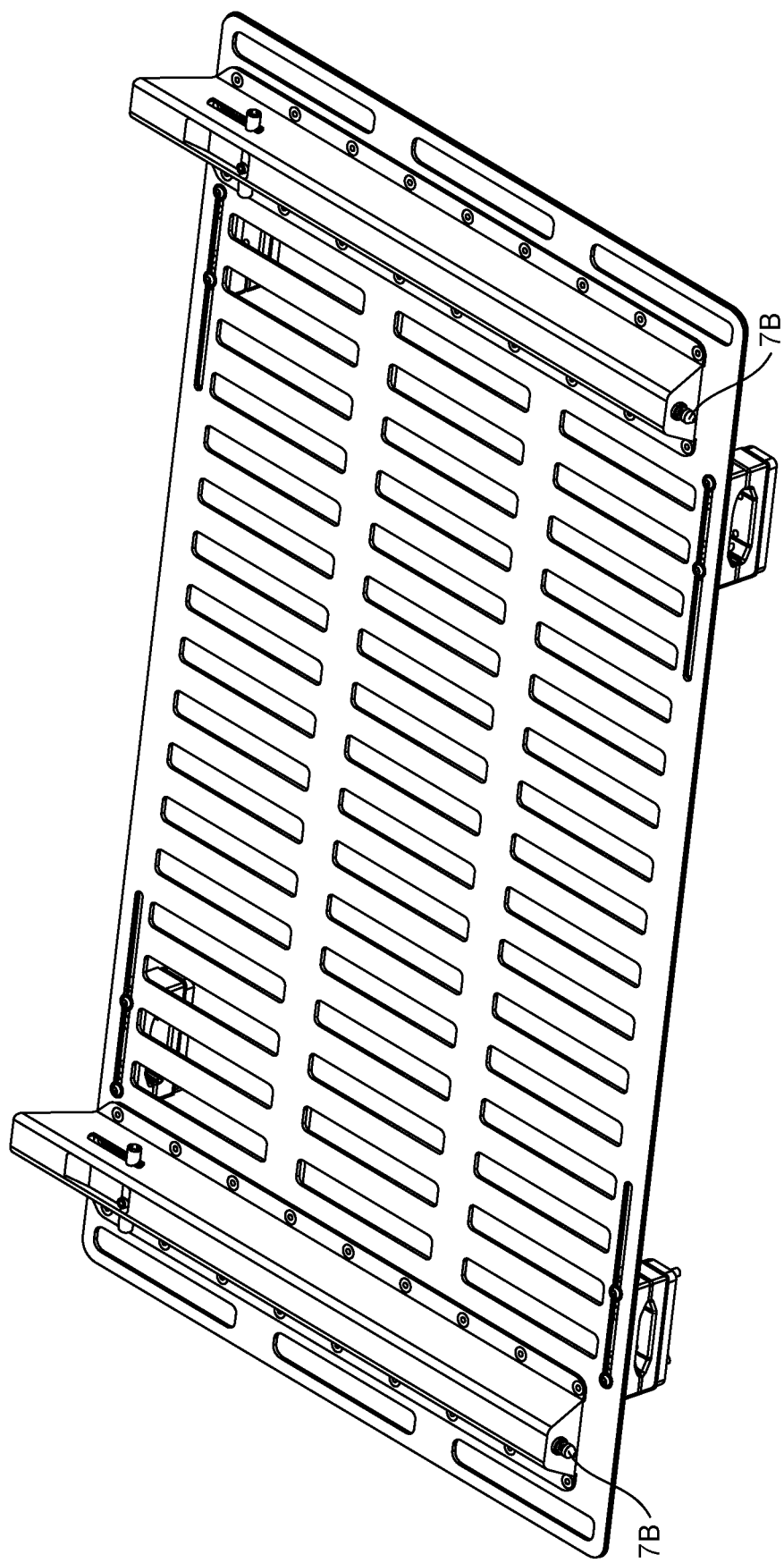
FIG. 13B is a perspective view of a second embodiment of the rooftop carrier clamp in use with a plate carrier.
Figure 14:
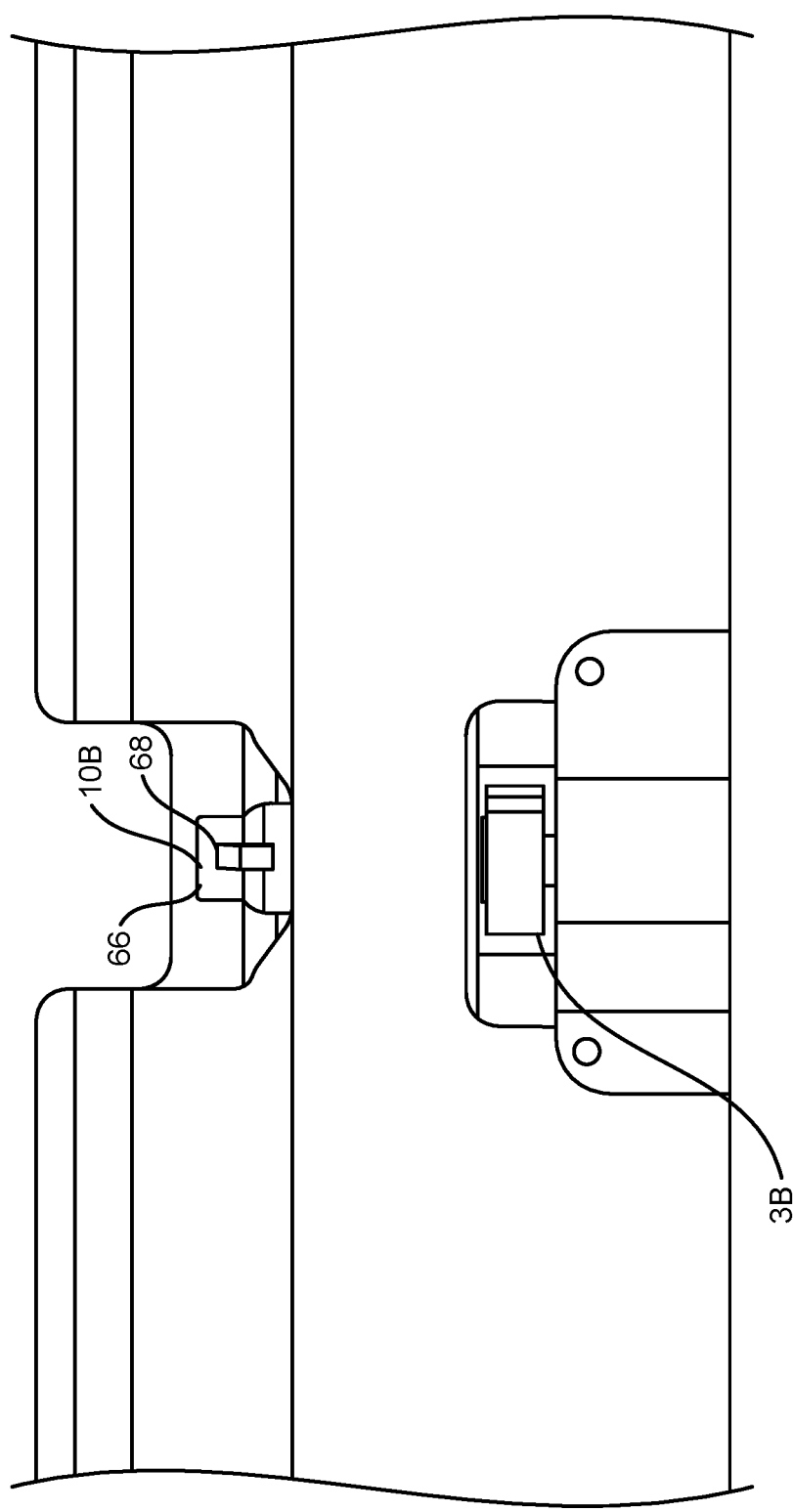
FIG. 14 is a zoomed in view of the bottom view of a second embodiment of the rooftop carrier clamp in use with the carrier of FIG. 13.
Figure 15:
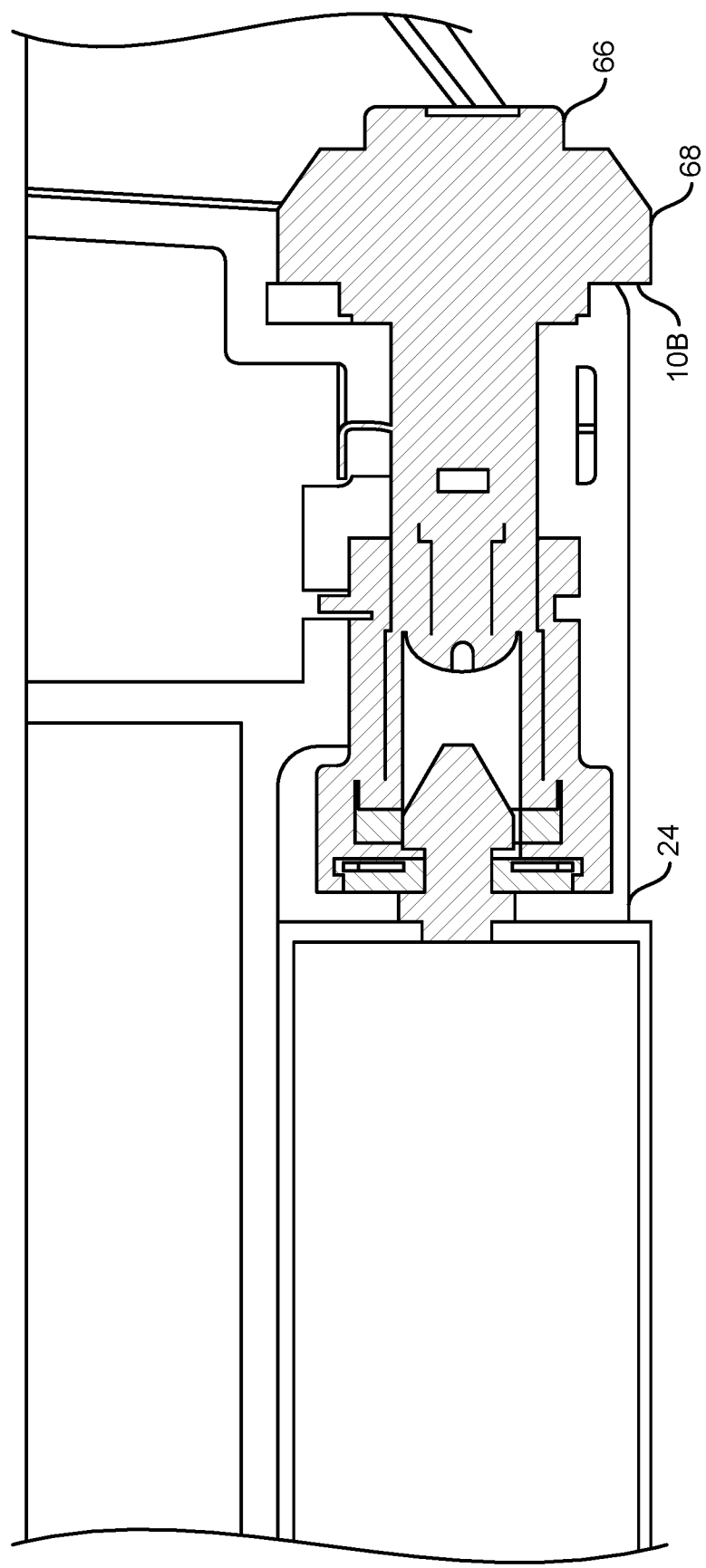
FIG. 15 is a cut away view of the bottom view of a second embodiment of the rooftop carrier clamp in use with the carrier of FIG. 13.
Figure 16:
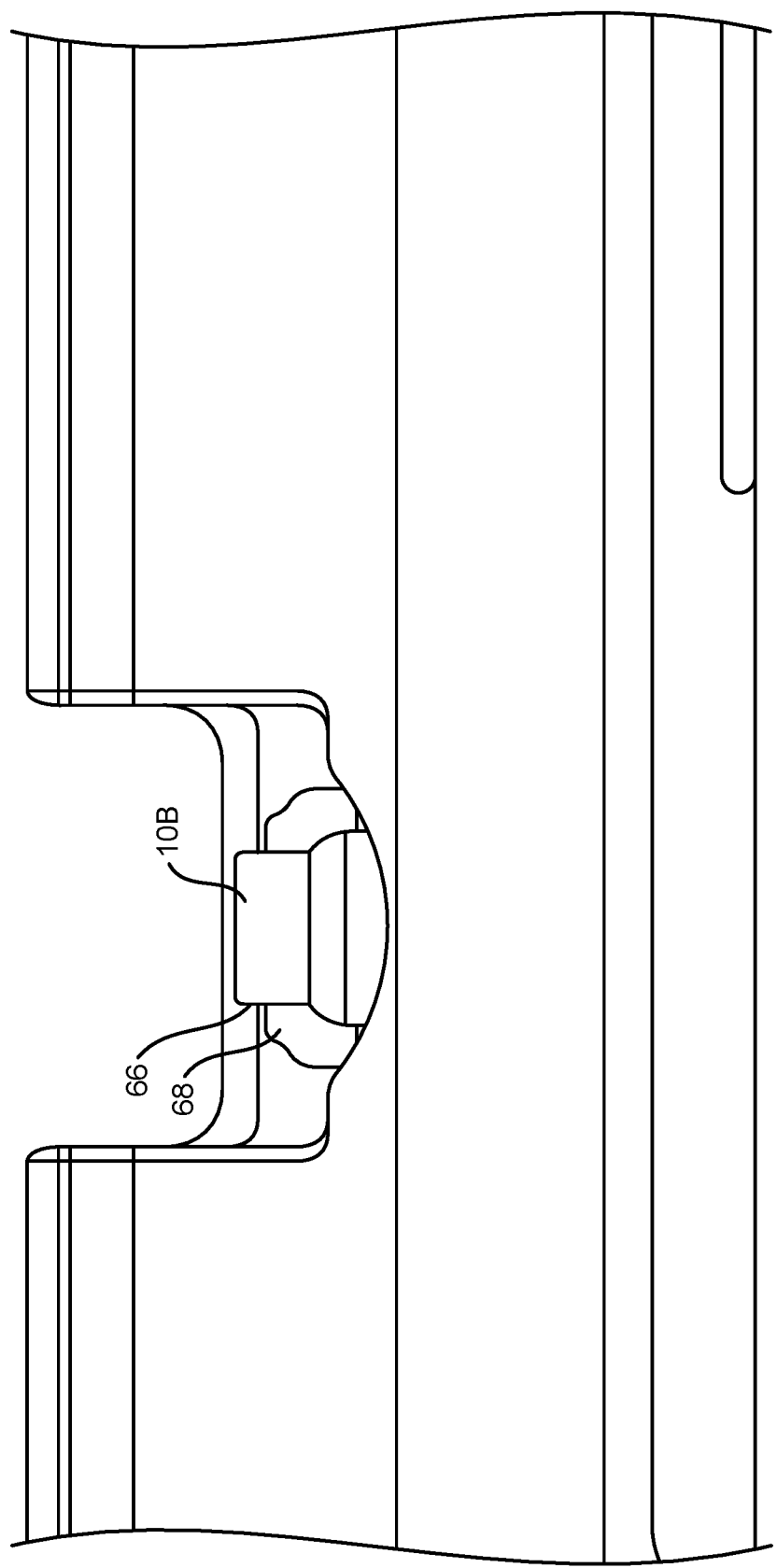
FIG. 16 is a zoomed in view of the bottom view of a second embodiment of the rooftop carrier clamp in use with the carrier of FIG. 13.
Figure 17:
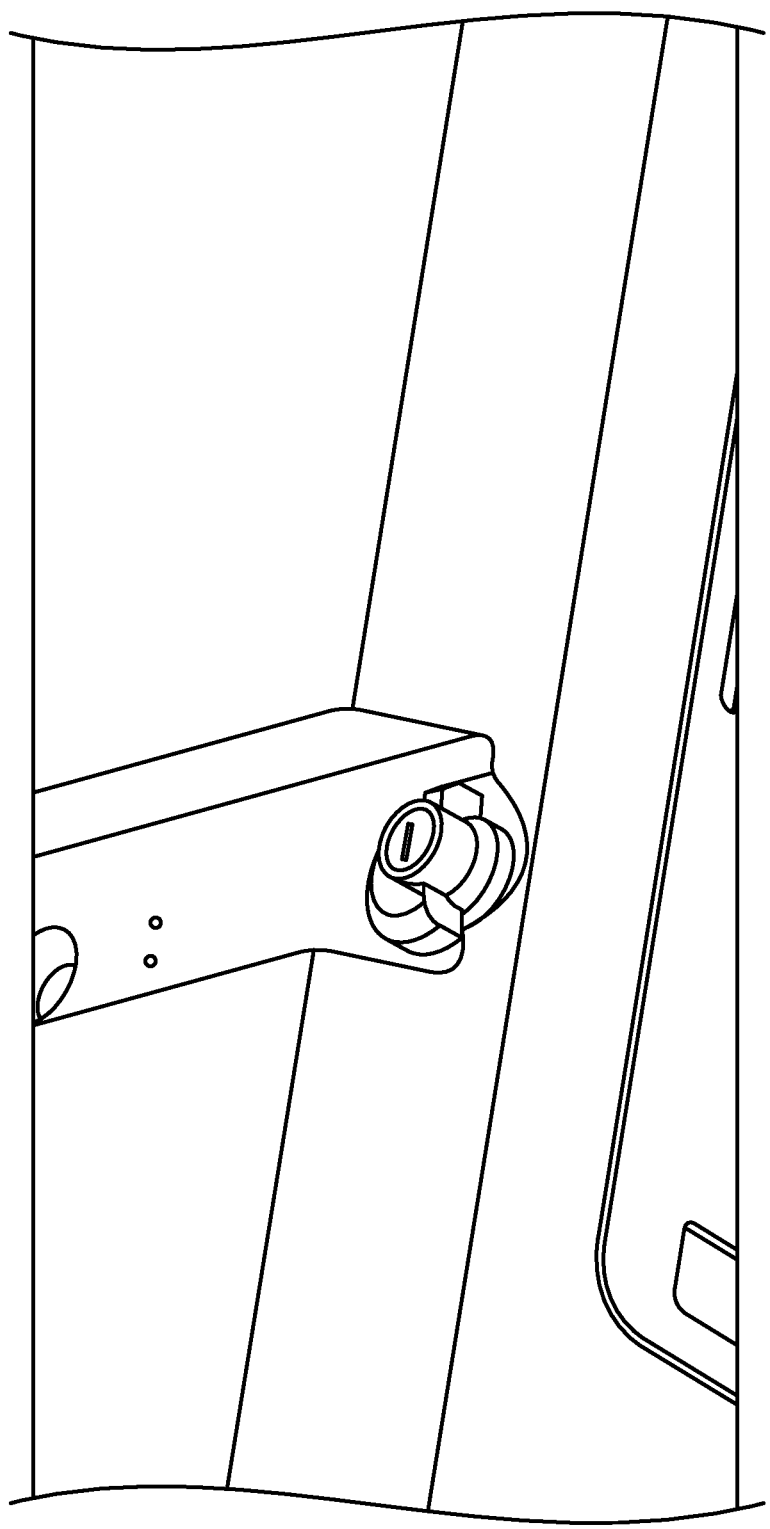
FIG. 17 is a zoomed in perspective view of a second embodiment of the rooftop carrier clamp in use with the carrier of FIG. 13.
Figure 18:
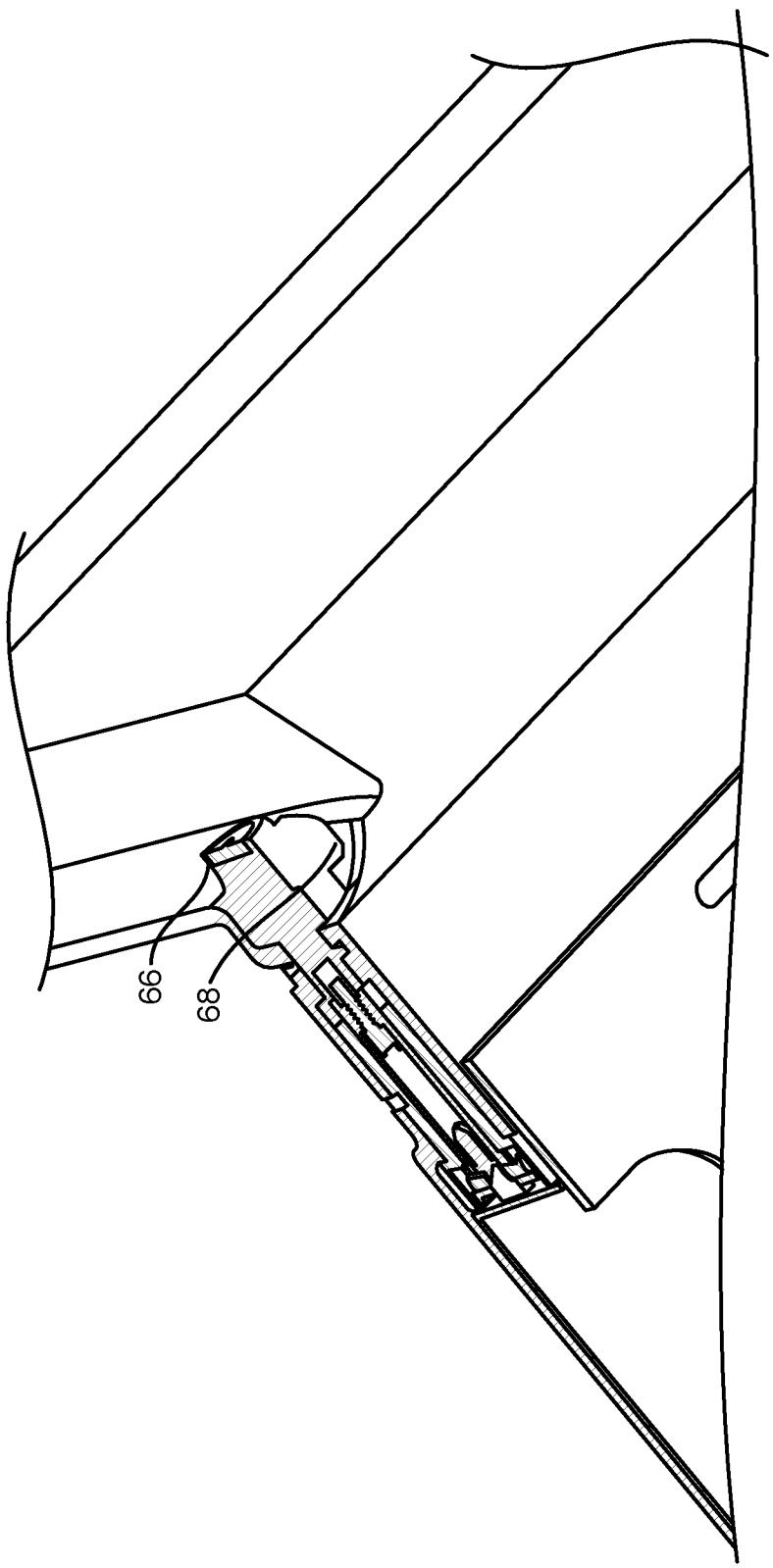
FIG. 18 is a cut away perspective view of the second embodiment of the rooftop carrier clamp in use with the carrier of FIG. 13.
Figure 19:
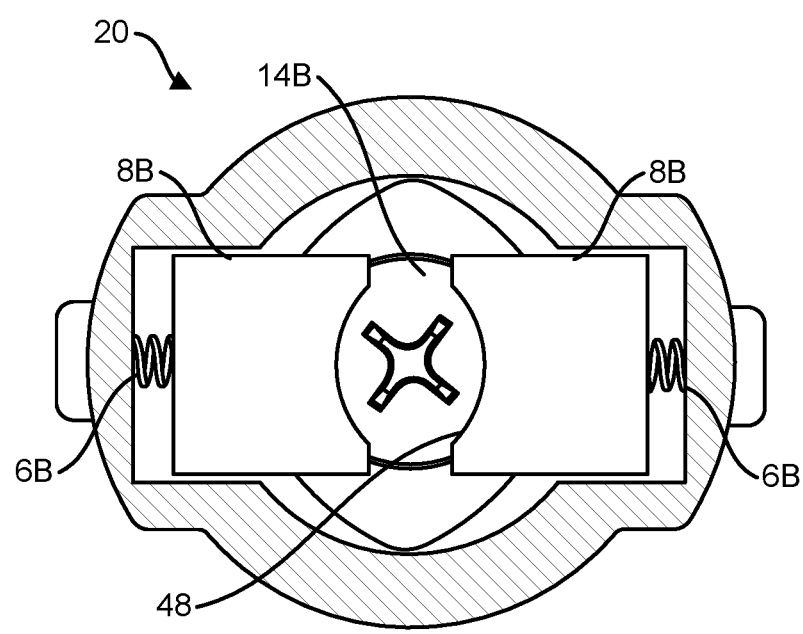
FIG. 19 is a cut away end view of the second embodiment of the rooftop carrier clamp.
Figure 20:
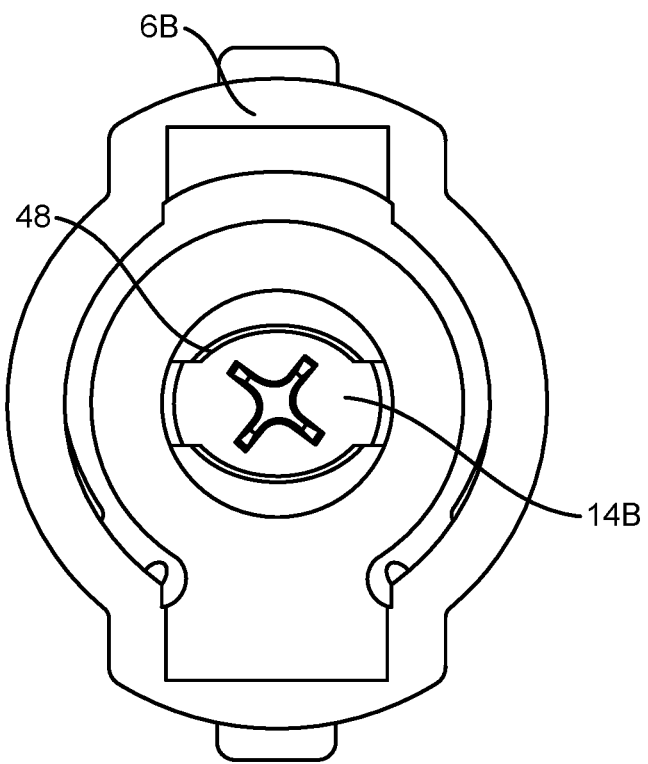
FIG. 20 is an end view of the second embodiment of the rooftop carrier clamp.
Figure 21:
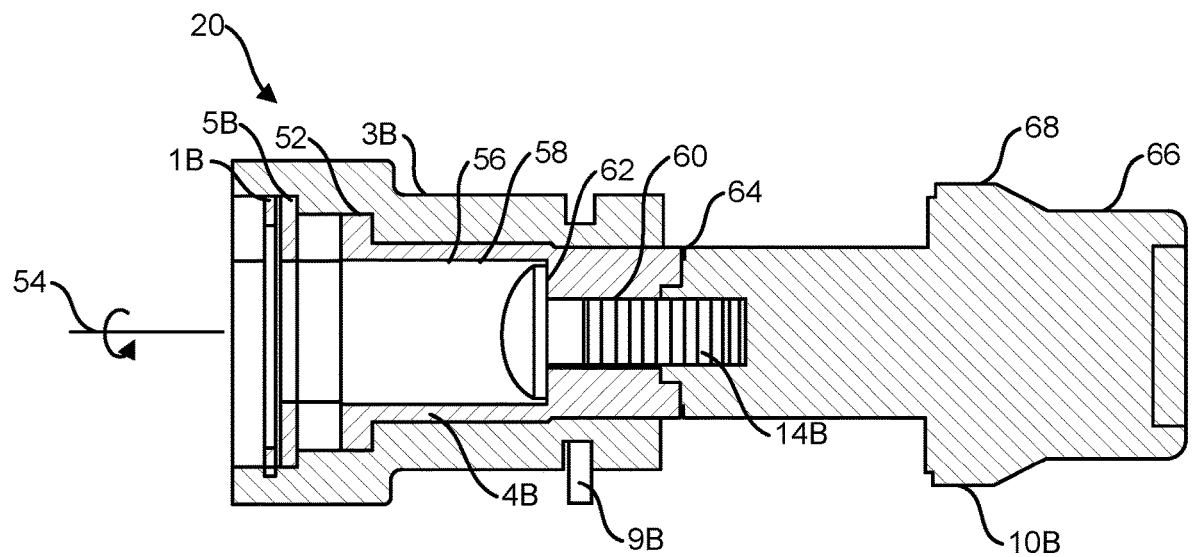
FIG. 21 is a cut away side view of the second embodiment of the rooftop carrier clamp.
Figure 22:
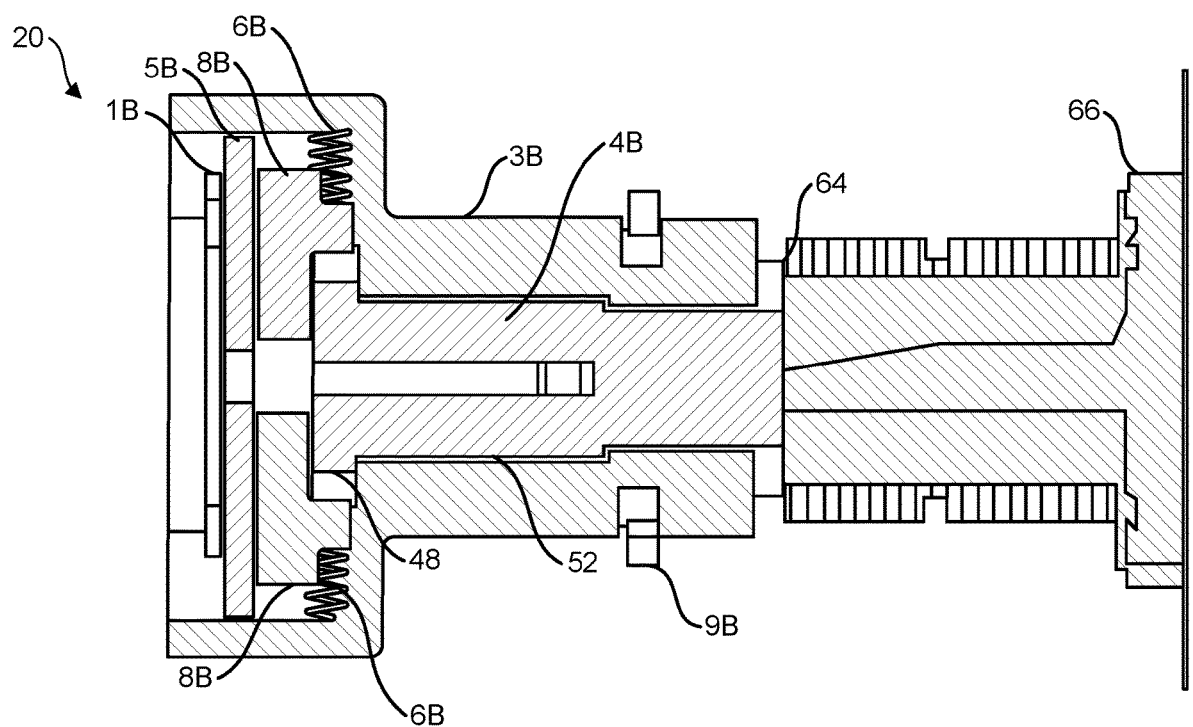
FIG. 22 is another cut away side view of the second embodiment of the rooftop carrier clamp.
Figure 23:
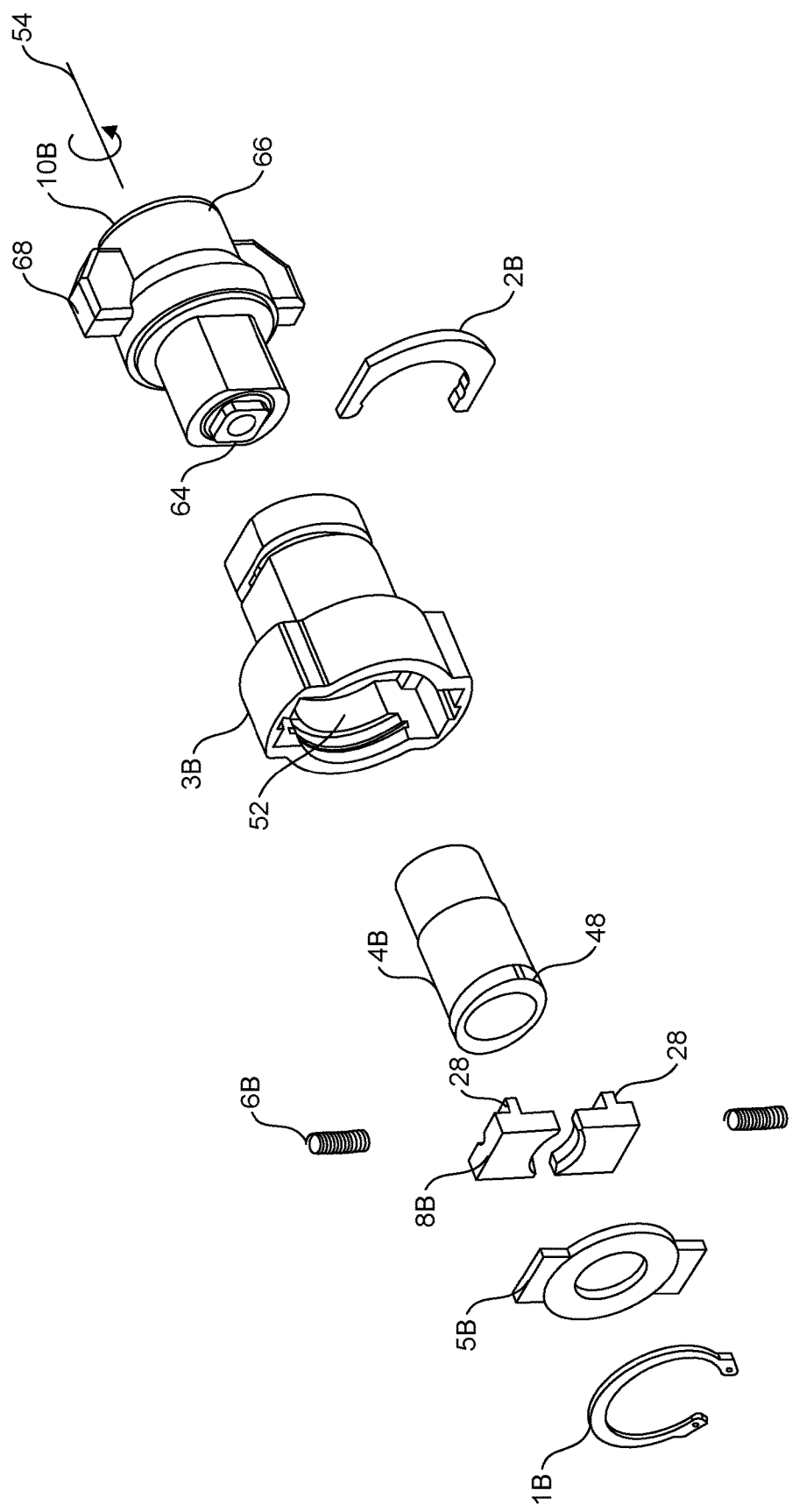
FIG. 23 is an exploded view of the second embodiment of the rooftop carrier clamp.
Figure 24:
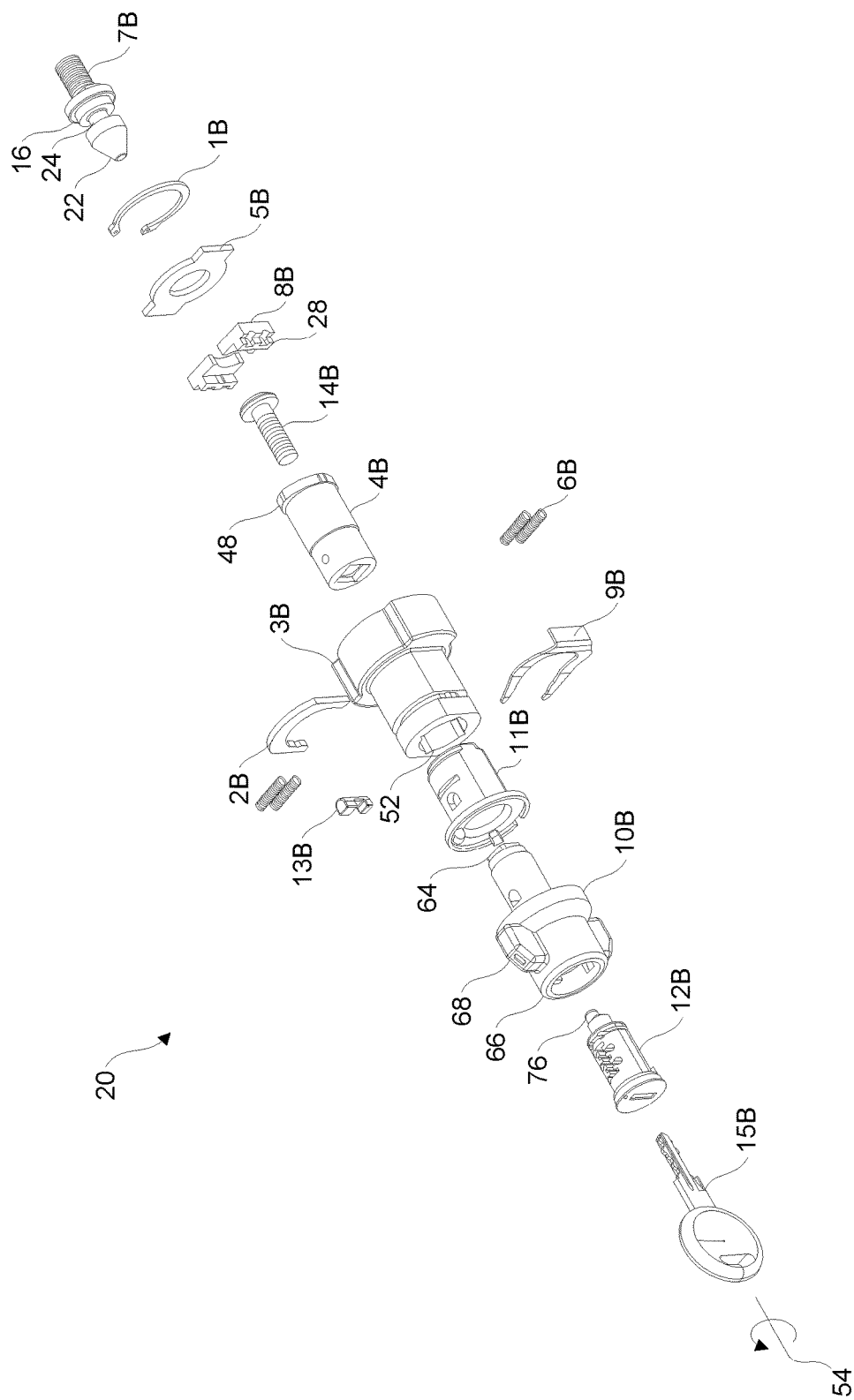
FIG. 24 is another exploded view of the second embodiment of the rooftop carrier clamp.

As best seen in FIGS. 4, 5 and 12, the core 2A terminates in an adaptor 30 that has an arm 40. In the unlocked condition, FIG. 4, the arm is outside of the bore 18 and does not interfere with the locking pin 10A, and thus the rotor 3A is able to pivot in the bore 18 about the first axis 26. In a locked condition, as shown in FIG. 5, the arm 40 extends into the bore 18, interfering with the locking pin 10A and restricting the rotor 3A from rotating or pivoting about the axis 26.

A release lever 6A is also attached to the rotor 3A at a first end 44 of the release lever 6A and extends through a radial slot 42 in the clamp housing so the second end 46 of the release lever 6A is outside of the clamp housing. In the unlocked condition, the release lever 6A can be manipulated by the user to rotate the rotor 3A to an unlocked condition, which retracts the bolts, uncapturing the locking post, and the locking post can be removed from the bore 18 in the clamp housing 8A.

Figure 2:
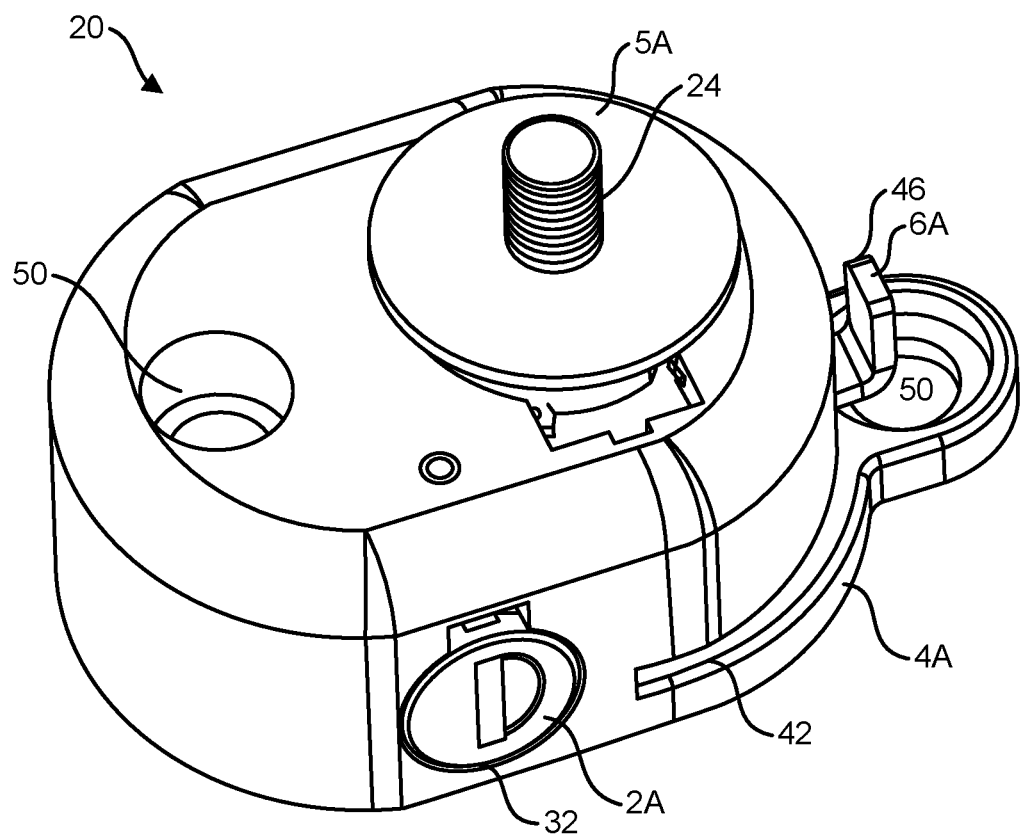
FIG. 2 is a perspective of one embodiment of the inventive rooftop carrier clamp taken from a different perspective.
Figure 3:
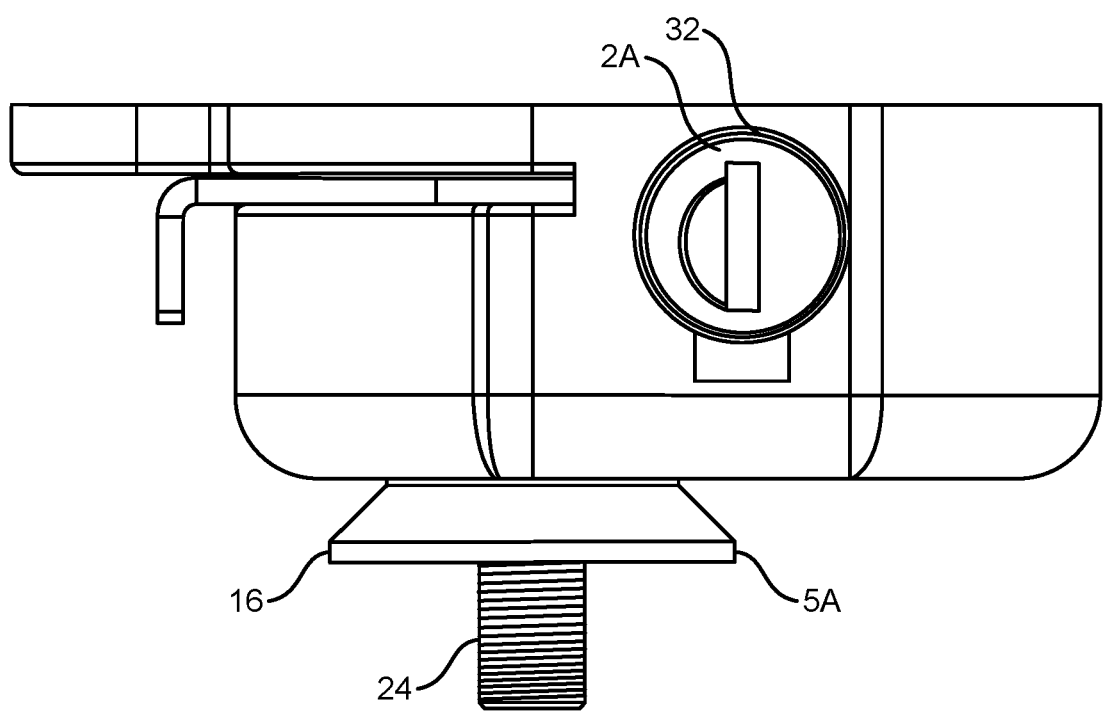
FIG. 3 is a side elevation view of one embodiment of the inventive rooftop carrier clamp.
Figure 10:
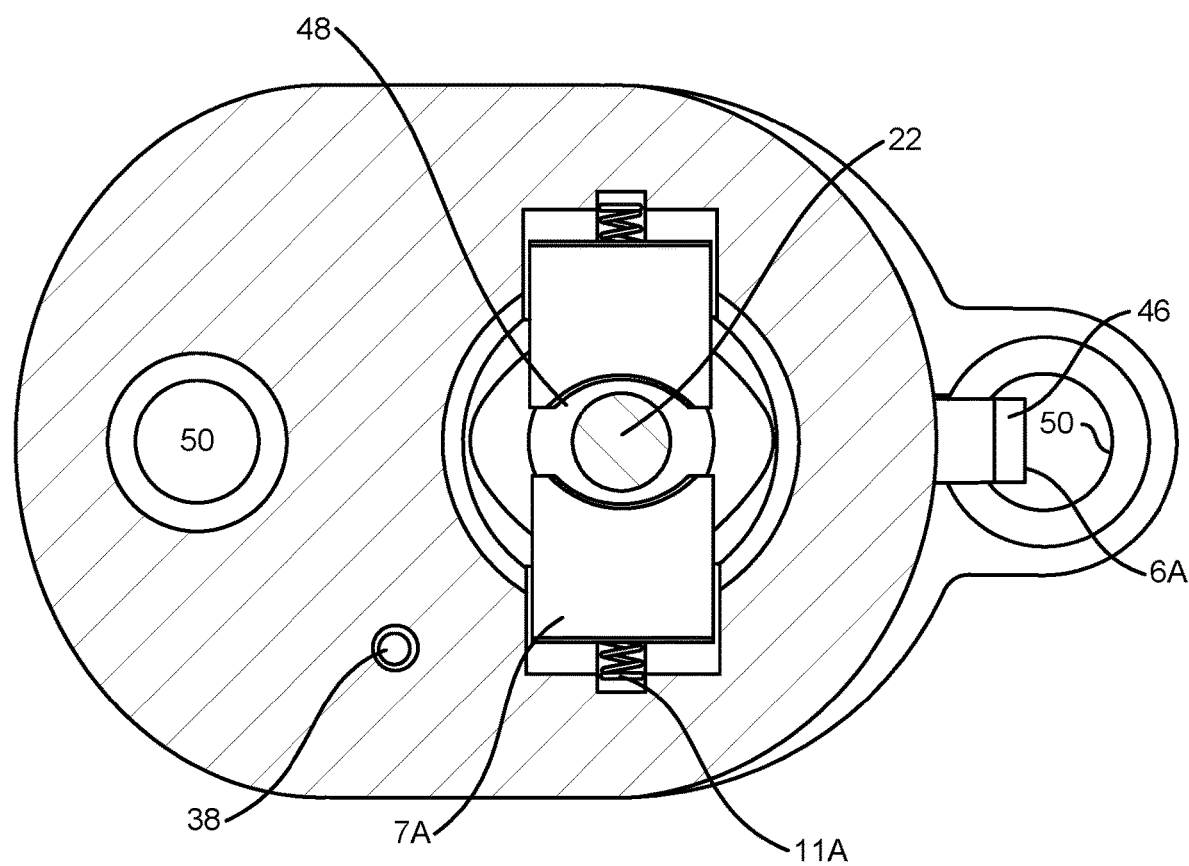
FIG. 10 is a bottom view of the inventive rooftop carrier clamp in the locked condition.
Figure 11:
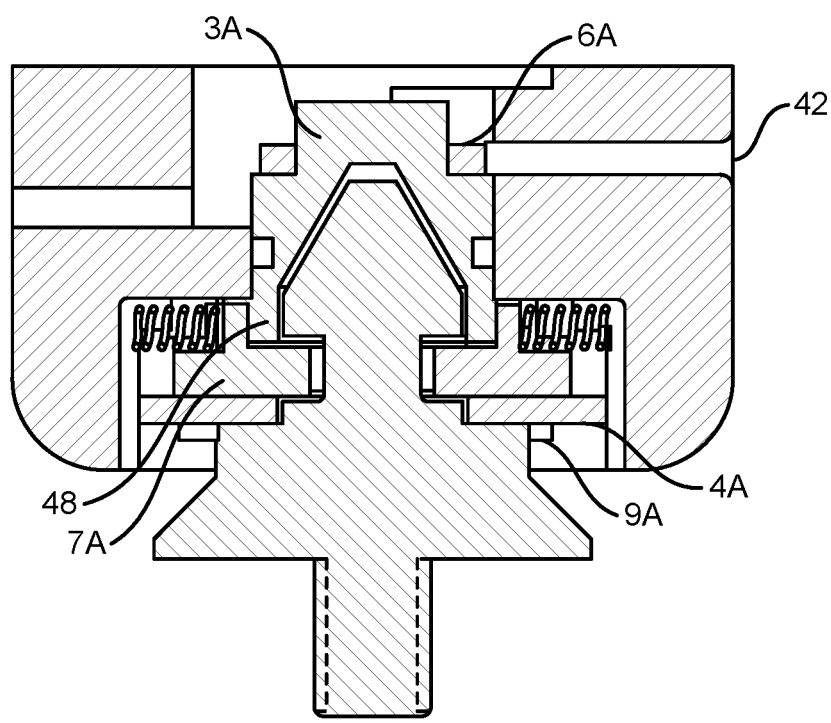
FIG. 11 is a cross section of the inventive rooftop carrier clamp in the locked condition.

In one embodiment the clamp housing 8A also has at least one, and preferably a pair of apertures 50 parallel to the bore 18 that are adapted to receive fasteners, such as rivets or threaded fasteners for attaching the clamp housing to the second substrate. As can be seen in FIGS. 2, 5 and 10, in the locked condition, the second end 46 of the release lever 6A extends into a space coaxial with at least one of the apertures 50 to interfere with an attempt to surreptitiously manipulate the attendant fastener. The release lever cannot be moved from this location while in the locked condition.

FIGS. 13-25 generally depict a second embodiment of the rooftop carrier clamp 20 having an adaptor housing 3B in which axis of rotation of the tumbler core 12B in the lock 32 is parallel to and preferably coaxial with, the axis of rotation of the rotor 4B whose cam outer surface retracts the bolts 8B transversely to allow for removal of a frusto-conically shaped locking post 7B. As with the first embodiment, the locking post 7B has a conical portion 22 with a base connected to a cylindrical stem 24. The locking post 7B can also have an optional skirt 16. The locking post 7B can be attached to the carrier, attached to transverse ribs in a plate attached to the vehicle (See FIGS. 12-18) or one of the rails of a vehicle as described above. In one embodiment, the locking post is attached in a horizontal orientation to a transverse rib on a plate that is attached to the vehicle. The opposite side of the rib on the plate has a sliding catch, so a complementary accessory can be lowered onto the plate, and slid horizontally so one side of the accessory is attached to the plate by the sliding catch and the other side by the locking post 7B being removably accepted and captured by the adapter housing 3B and related parts as will be described hereafter.

The hollow generally cylindrical housing 3B has a stepped bore 52. A rotor 4B pivots about a first axis 54 defined by the bore 52. The rotor 4B also has a stepped bore 56 with a first portion of the bore 58 having a larger diameter than the second portion 60 of the bore 56, with a transverse wall 62 separating the first portion 58 from the second portion 60 of the bore. The rotor also has a cam shaped outer surface 48 proximate one end.

Similar to the first embodiment, the bore 52 also has a pair of bolts 8B that are biased inwardly by biasing means 6B, such as springs contacting outer walls of arms 28 of the bolts to a space adjacent the cylindrical stem 24 and beneath the base of the conical portion 22 to capture the locking post 7B. The bolts 8B are moveable outwardly in a plane transverse to the axis 54 by the cam 48 on the outer surface of the rotor 4B during rotation of the rotor about the axis 54. Each bolt may have one or two springs biasing the bolt inwardly.

Figure 25:
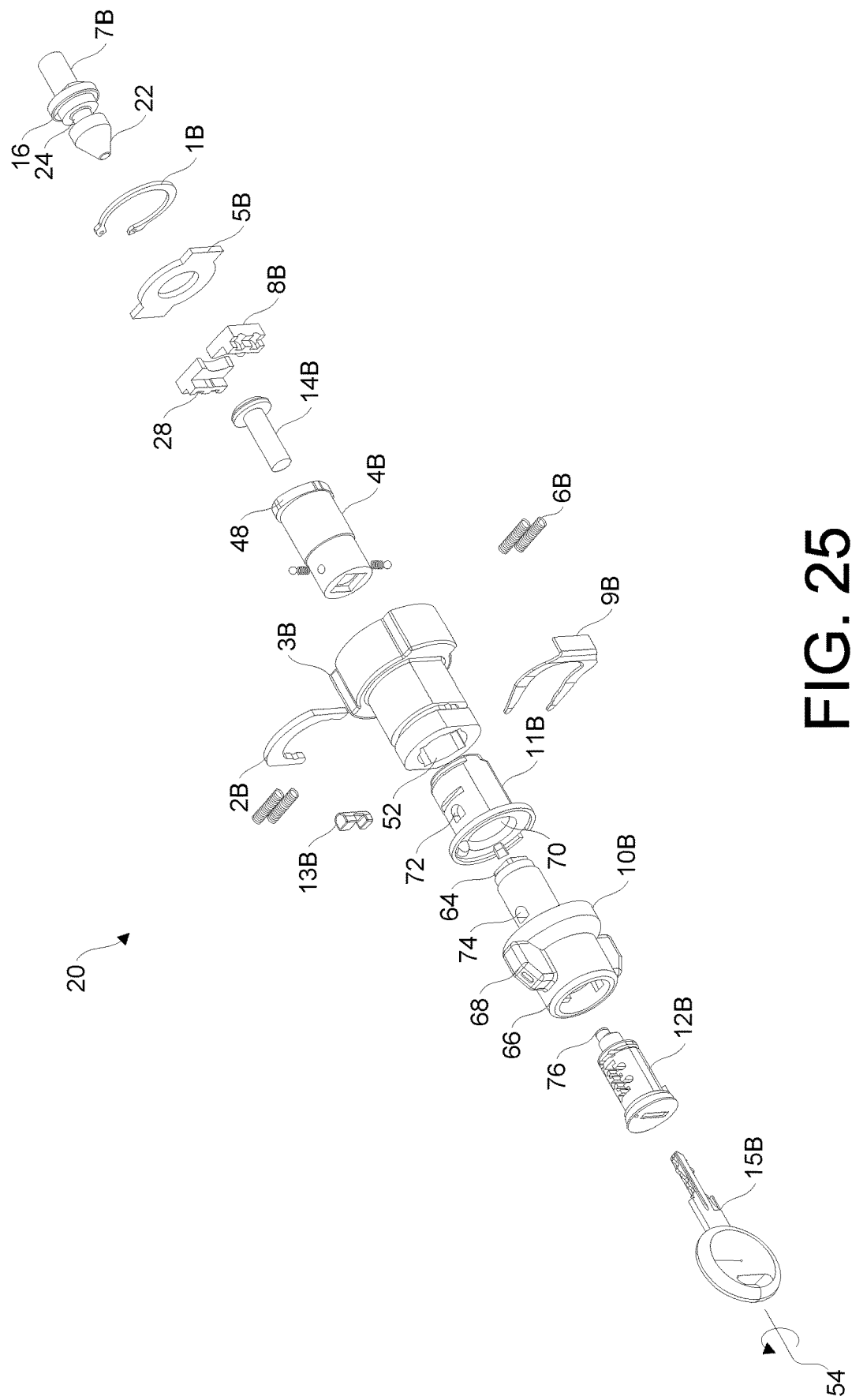
FIG. 25 is another exploded view of the second embodiment of the rooftop carrier clamp.

The rotor 4B is pivoted by being operatively connected to a lock knob 10B. The lock knob is attached to the rotor 4B at the end of the rotor associated with the second bore portion 60 by a threaded fastener 14B having a head contacting the transverse wall 62 of the rotor 4B, extending through the second bore portion 60 and into a threaded bore in the second end 64 of the lock knob 10B. The first end 66 of the lock knob 10B has wings 68 or other graspable features to allow for pivoting movement of the lock knob by the operator. The second end 64 of the lock knob 10B may also be non-circular and mate with a complementary non-circular end of the rotor. The rotor 4B and bolts 8B are held in the bore 52 by an internal retaining ring 1B and a rear cover plate 5B. As seen in FIG. 25, an aperture 74 is located in the cylindrical wall of the lock knob 10B near its second end 64. A lock bolt 13B is slidably located in the aperture 74 to be able to move in a plane transverse to the axis 54.

A hollow generally cylindrical lock housing or spacer 11B is surrounds the second end 64 of the lock knob 10B. The spacer 11B has a bore 70 with an axis coaxial with the axis 54 in which the second end 64 of the lock knob 10B can rotate in an unlocked condition. The spacer also has an aperture 72 in the cylindrical wall. A lock bolt 13B is slidably located in the aperture 72 to be able to move in a plane transverse to the axis 54.

A tumbler core 12B of a lock 32, similar to the core of the lock in the first embodiment pivots in the bore of the lock knob 10B about the axis 54 in a manner similar to that described more fully with respect to the first embodiment. The core second end has an adapter or nub 76 that cooperates with the lock bolt 13B to move the lock bolt transverse to the axis 54 in aperture 74 in the lock knob 10B and into and out of aperture 72 in the spacer 11B.

Based on the above, when an appropriate key 15B is inserted into the keyway of the core 12B, it retracts the tumblers, and the core can be rotated into an unlocked condition. In the unlocked condition, the adaptor or nub 76 retracts the lock bolt 13B from the aperture 72 in the spacer 11B, thus allowing the lock knob 10B to rotate in the bore of the spacer 11B. The operator can then grasp the wings 68 on the first end 66 of the lock knob and the lock knob 10B can be rotated to also rotate the rotor 4B. When the rotor rotates, or pivots 90° about the axis 54, the cam on the outside surface of the rotor 4B works against the bias of the bolts 8B to move the bolts radially outwardly to release the capture of the locking post 7B to it to be retracted from the bore 58.

Embodiments of the above-described devices, systems, and methods easily and securely clamp vehicle accessories such as rooftop carriers to vehicles and provide users a number of beneficial technical effects and a more desirable user experience as compared to known vehicle accessory clamps. Such benefits include, without limitation, greater convenience in installing and detaching the carriers from the vehicle, more aerodynamic, being less expensive and less time-consuming, being easier to operate and maintain, requiring fewer modifications to vehicles to which they are attached and/or to the vehicle accessories themselves, and making attaching the vehicle accessories to vehicles less likely to violate vehicle warranty conditions.

I claim:

1. A lockable rooftop carrier clamp comprising;
  a locking post fixed to a first substrate, the locking post having a frusto-conical plunger tapering at its first end and connected to a cylindrical stem at its base or second end, with the diameter of the cylindrical stem being smaller than the diameter of the base, with a first end of the stem attached to the base of the cone and a second end of the stem connected to the first substrate,
  a clamp housing fixed to a second substrate, the housing having a first bore defining a first axis with a first open end adapted to accept the locking post in a captured or uncaptured condition, the clamp housing also having a second blind bore defining a second axis orthogonal to the first axis, the second bore extending through a side wall of the clamp housing,
  a bolt positioned in the first bore to slide transversely to the first axis therein, the bolt being biased inwardly and adapted to capture the locking post as the locking post moves past the bolt from its first end to its second end, the bolt also having an arm,
  a rotor also located in the first bore, the rotor having a bore along the first axis adapted to accept the conical portion of the locking post when it is inserted into the first end of the clamp housing first bore, the rotor also having a cam shaped exterior wall adapted to contact the arm of the bolt so that when the rotor is pivoted from a captured condition to an uncaptured condition about the first axis, the exterior wall moves the bolt transversely outwardly against the bias and away from the locking post, the rotor also having a locking pin extending outwardly from the rotor exterior,
  a release lever operatively connected to the rotor and extending from the rotor transverse to the first axis to a location outside the clamp housing for pivoting the rotor about the first axis from an uncaptured to a captured condition and from a captured to an uncaptured condition,
  a hollow generally cylindrical lock housing fixed in the second blind bore having lock housing bore and a pair of longitudinal splines and adapted to receive a core having a plurality of tumblers variously biased into the splines and retracted from the splines in the presence of an appropriate key to allow the core to rotate in the bore from a locked to an unlocked condition along the second axis, the core having a keyway at a first end for accepting a key and an adapter at the opposite second end, with the adapter interfering with the locking pin when the core is in the locked condition so that the rotor cannot pivot, and allowing pivoting of the rotor about the first axis by the release lever while the core is in the unlocked condition.

2. The lockable rooftop carrier clamp of claim 1 having a pair of bolts positioned opposite each other in the first bore, each of the bolts being biased inwardly by a spring.

3. The lockable rooftop carrier clamp of claim 2 wherein the clamp housing is generally cylindrical shaped exterior with the cylinder axis along the first axis, the clamp housing having a second end contacting the second substrate.

4. The lockable rooftop carrier clamp of claim 3 wherein the clamp housing also has a pair of apertures adapted to accept threaded fasteners for mounting the clamp housing to the second substrate at its second end and the portion of the release lever located outside of the clamp housing interferes with access to at least one of the apertures when in the locked condition.

* * * * *